United States Patent [19]

Landry et al.

[11] Patent Number: 5,183,321

[45] Date of Patent: Feb. 2, 1993

[54] HAND BRAKE MECHANISM FOR A CENTRAL PROCESSING UNIT CABINET

[76] Inventors: Christian C. Landry, 224 Old Littleton Rd., Harvard, Mass. 01451; Jause Kuo, 255, Jen-Ho Road, Sec. 2, Tachi, Taoyuan, Taiwan; Ching-Shi Chen, 255, Jen-Ho Road Sec. 2, Tachi, Taoyuan, Taiwan; William Wu, 255, Jen-Ho Road, Sec. 2, Tachi, Taoyuan, Taiwan

[21] Appl. No.: 718,497

[22] Filed: Jun. 20, 1991

[51] Int. Cl.$^5$ .............................................. A47B 88/00
[52] U.S. Cl. ....................................... 312/250; 188/69
[58] Field of Search ............................ 188/31, 60, 69; 312/250

[56] References Cited

U.S. PATENT DOCUMENTS 2,879,865  3/1959  Simmons ........................... 188/69
3,023,631  3/1962  Curtis ................................. 188/31
3,690,415  9/1972  Nordskog ............................ 188/69

*Primary Examiner*—Joseph Falk

[57] ABSTRACT

A hand brake mechanism for a central processing unit cabinet comprising a base and a handle, wherein the base is fixed on the bottom of the cabinet and located between two wheels provided on the cabinet. A pair of engaging rods, each engaging rod having a guide pin at one end, are provided on both sides of the base. The handle is combined with the base, and is slidable thereon. There are a pair of guide plates provided on the handle at a location corresponding respectively to each of the engaging rods. The guide pin of the engaging rod comes into contact with the edge of the guide plate. When pushing or pulling the handle, the guide pin slides along the guide plate, and the engaging rod moves axially, to engage or disengage the wheels of the CPU cabinet.

8 Claims, 4 Drawing Sheets

FIG_3

HAND BRAKE MECHANISM FOR A CENTRAL PROCESSING UNIT CABINET

FIELD OF THE INVENTION

The invention relates to a hand brake mechanism for a central processing unit cabinet and is more particularly concerned with a hand brake mechanism mounted on the bottom of the cabinet.

BACKGROUND OF THE INVENTION

Conventional cabinets housing a central processing unit of a computer are usually large, heavy and inconvenient to shift from one place to another. To facilitate movement, wheels may be mounted on the bottom of the cabinet. Usually, a braking structure is provided for at least two of the wheels to ensure that the cabinet remains fixed in place when operational. This braking structure generally comprises an engaging lever and locking element. When the engaging lever is pressed, it actuates the locking element to engage with the wheel thereby impeding rotation of the wheel, and thus braking the cabinet. Conversely, lifting the engaging lever disengages the locking element to permit the wheel to rotate freely so that the cabinet can be moved. Generally, a traditional engaging structure is provided for each wheel independently, requiring successive operations for each wheel to enable and disable movement of the cabinet. It is inconvenient to operate such a structure, and also, it may be difficult to distinguish if the wheels of the cabinet are locked or unlocked.

SUMMARY OF THE INVENTION

According to the invention, a hand brake mechanism is provided which mitigates the above drawbacks. The hand brake mechanism, which can simultaneously and firmly brake the individual wheels of a CPU cabinet, is simply constructed and easily operated and does not obstruct differentiation of whether the wheels of the CPU cabinet are locked or not.

In accordance with the present invention a hand brake mechanism is mounted on the bottom of the cabinet. The braking mechanism is comprised of a base and a handle. The base includes a pair of engaging rods for simultaneously engaging with a pair of wheels located under the cabinet. When the handle is pushed, the two engaging rods move in a lateral direction outwards from the base engaging the wheels so that wheel rotation is inhibited. On the contrary, when the handle is pulled, the engaging rods disengage from the wheels, allowing the cabinet to be moved.

These and other objects, advantages and features of the present invention will be more fully understood and appreciated by reference to the written specification and appended drawings.

DETAILED DESCRIPTION OF THE INVENTION

Figure 1:
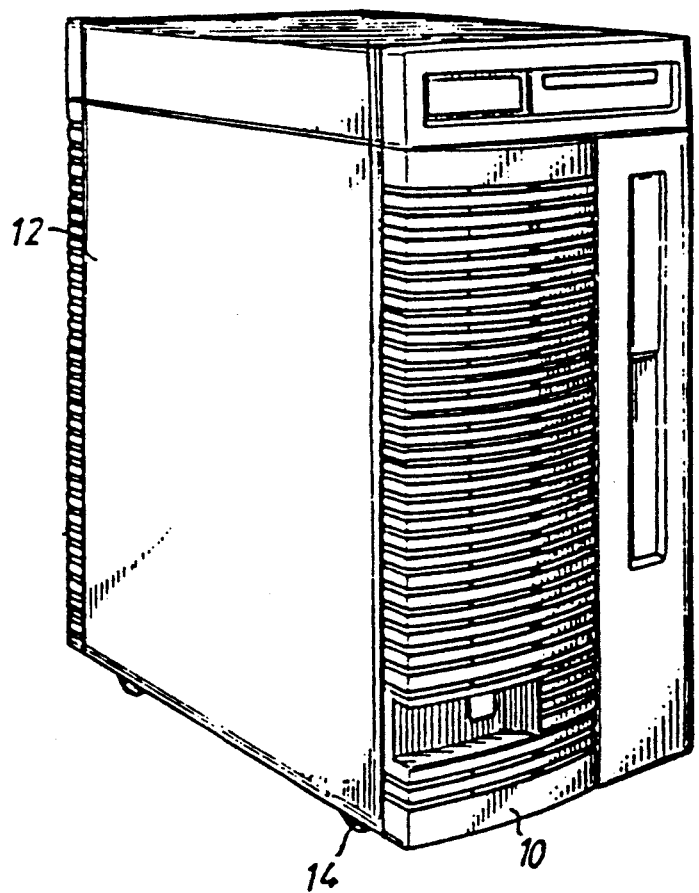
FIG. 1 is a perspective view of a CPU cabinet with the hand brake mechanism of this invention mounted thereon.
Figure 2:
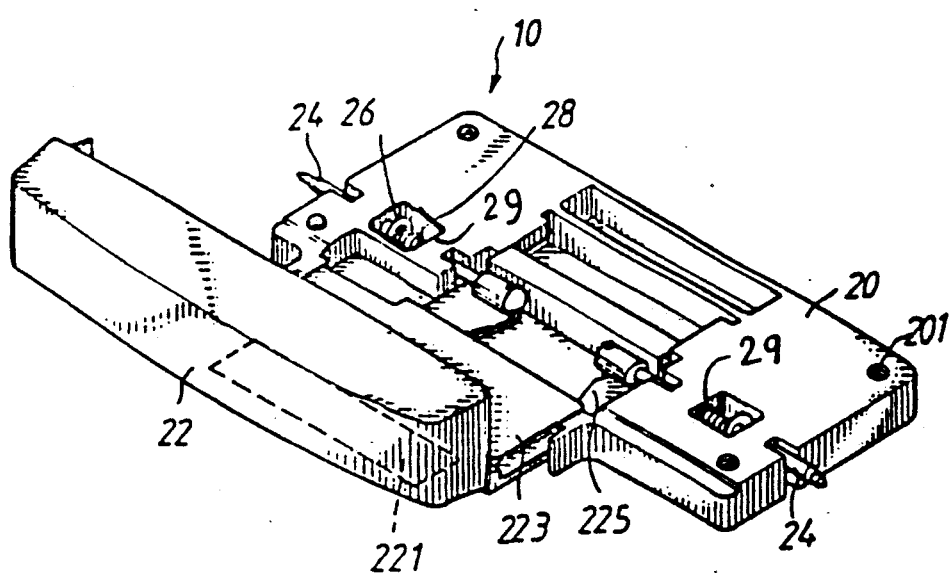
FIG. 2 is a perspective view of the hand brake mechanism in accordance with the present invention.
Figure 3:
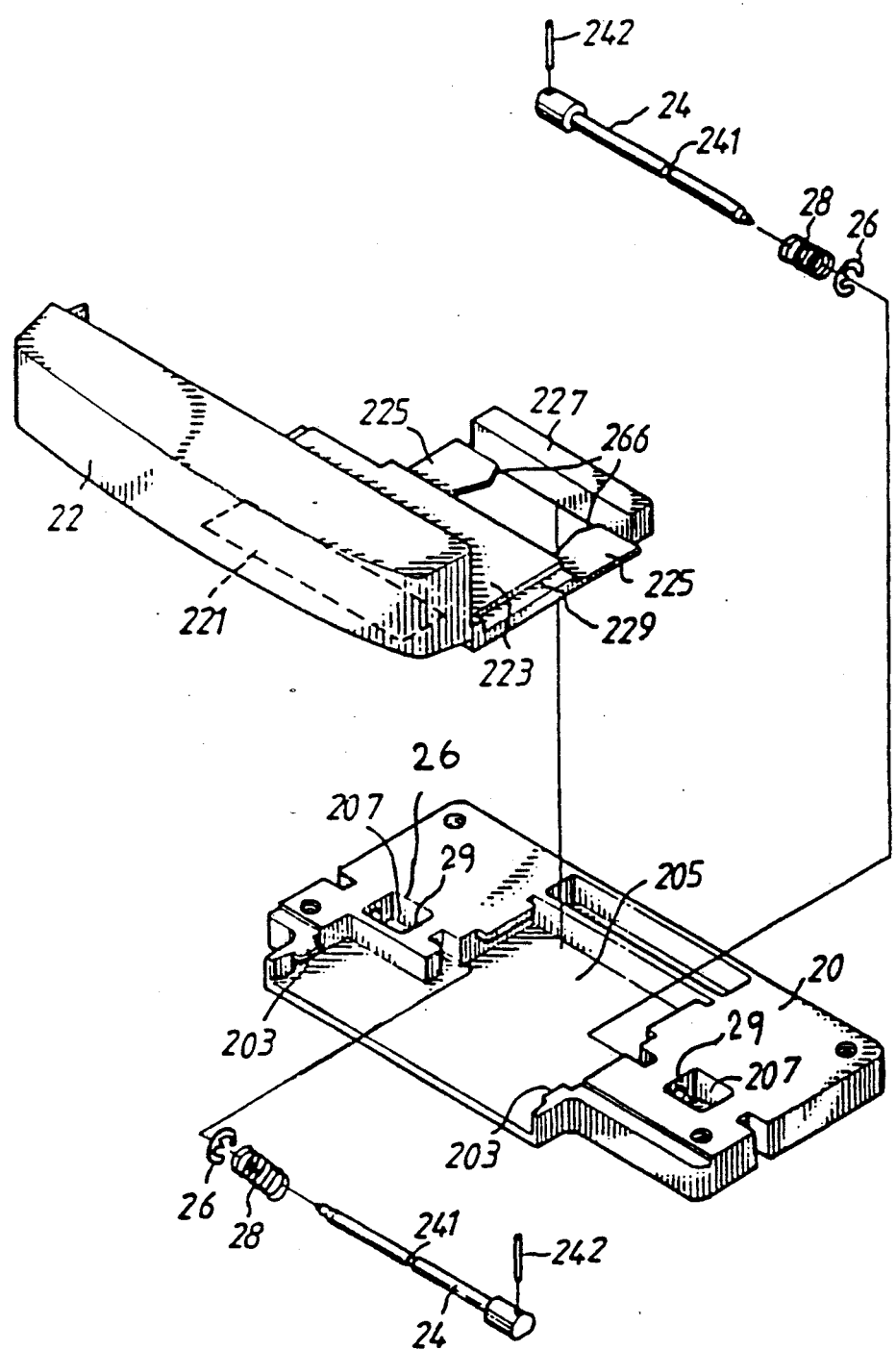
FIG. 3 is an exploded view illustrating component parts of the hand brake mechanism in accordance with the present invention.

Referring to FIGS. 1 to 3 there is shown a hand brake mechanism 10 for a central processing unit (CPU) cabinet 12. The hand brake mechanism essentially comprises a base 20 and a handle 22. The base 20 has four threaded holes 201, one provided at each corner, for mounting the base 20 on the bottom of the cabinet 12 in an area located generally between two wheels 14 provided on the cabinet. Screws, not shown, may be used to connect the base 20 to the bottom of the cabinet 12. An irregular groove 205 is substantially formed on the central part of the base 20. A pair of engaging rods 24 are provided on both sides of the base 20, each engaging rod 24 passing through the base 20 in a lateral direction parallel to the plane of the base 20 and perpendicular to the plane of rotation of the wheels 14. One end of the engaging rods 24 protrudes outside the base 20, and the other end of the engaging rods 24 protrudes over the groove 205.

As the engaging rods 24 are identical, a description of one will suffice. The engaging rod 24 possesses a larger end having a guide pin 242 thereon and provides a retainer ring 26 on a retainer ring groove 241 located at the center thereof. At a location corresponding to the retainer ring groove 241 of the engaging rod 24, an opening 207 is provided in the base 20. A spring 28 is disposed around the engaging rod 24, one end of the spring 28 touches the retainer ring 26 and the other end of the spring 28 touches the edge 29 of the opening 207, rendering the engaging rod 24 to be axially elastic.

The handle 22 is a substantially curved shape with a generally rectangular slot 221 on the bottom thereof for easy gripping. The handle 22 is formed with a generally rectangular plate-like extension part 223 projected substantially on one half of the inner edge thereof in a direction parallel to the base 20. There is a pair of guide plates 225 provided apart on the edge of the extension part 223 respectively and both guide plates 225 are connected by a connecting bar 227 at the individual ends thereof. The inner edge of the guide plate 225 is formed oblique outwardly from one end, and possesses a chamfer 226 abutting the oblique edge at the other end. The handle 22 is set on the groove 205 of the base 20, whereon it can slide to and fro in a direction perpendicular to the central axis of the engaging rods 24. It should be noted that the locations of the pair of guide plates 225 of the handle 22 correspond to the engaging rods 24, and the guide pin 242 of the engaging rod 24 comes into contact with the oblique angled inner edge of the guide plate 225 when the handle 22 is set on the groove 205 of the base 20. Additionally, each side of the extension part 223 of the handle 22 provides a sliding groove 229 corresponding to a guide lug 203 mounted on the edge of the groove 205 of the base 20 for easy guiding during the movement of the handle 22.

Figure 4:
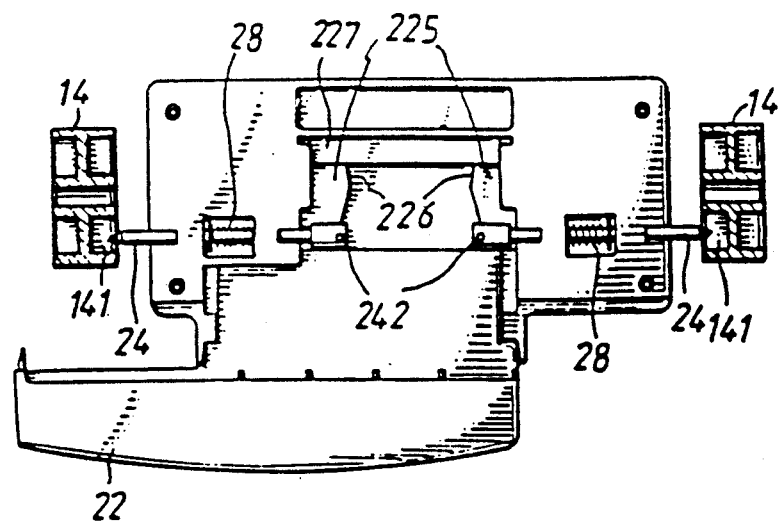
FIG. 4 is a plan view illustrating the engaging rods engaged to the wheels.

With reference to FIG. 4, when the handle 22 of the hand brake mechanism 10 is in the normal position, the engaging rod 24 inhibits rotation of the wheel 14 by having one end thereof placed between two spokes 141.

Figure 5:
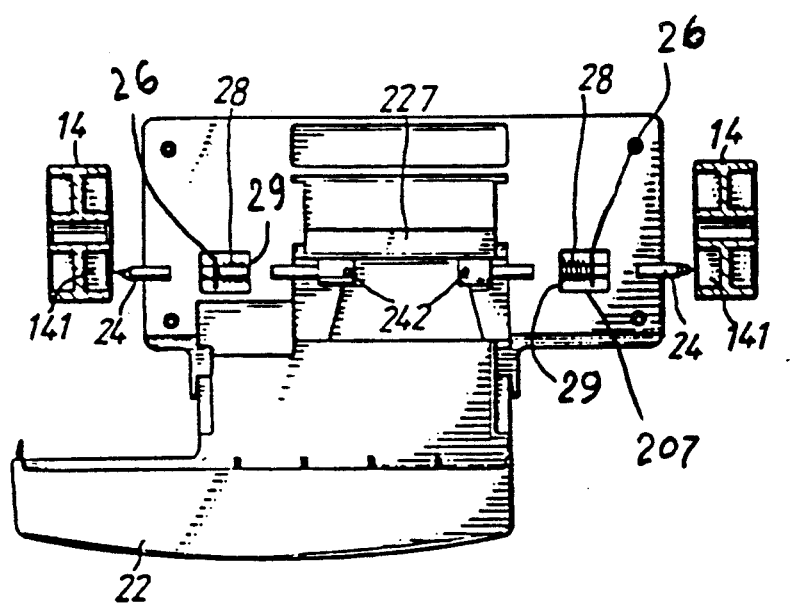
FIG. 5 is a plan view illustrating the engaging rods disengaged from the wheels.

As shown in FIG. 5, pulling the handle 22 causes the guide pin 242 of the engaging rod 24 to slide along the oblique edge of the guide plate 225. Simultaneously, the spring 28 around the engaging rod 24 is compressed, as the engaging rod 24 is withdrawn from between the spokes 141 of the wheel 14. When the guide pin 242 reaches the chamfer 226 of the guide plate 225, the engaging rod 24 touches the connecting bar 227. Connecting bar 227 prevents the handle 22 from moving further and stabilizes the engaging rod 24. To relock the wheels 14 of the cabinet 12, simply push the handle 22 to cause the guide pin 242 to leave the chamfer 226, and the guide pin 242 of the engaging rod 24 slides along the oblique edge of the guide plate 225 by the resilient force of the spring 28 until the engaging rod 24 is positioned between the spokes 141 of the wheel 14.

As described herein, the braking mechanism 10 can simultaneously and firmly brake the individual wheels 24 of the cabinet 12. Furthermore, to distinguish whether the wheel 14 is locked is merely a question of determining the position of the handle 22.

Of course it is understood that the above is merely an exemplary embodiment of the invention and that various changes and alterations can be made without departing from the spirit and broader aspects thereof as set forth in the appended claims.

What is claimed is:

1. A hand brake mechanism for a cabinet mounted on wheels for movement, comprising:
    a base having a groove (205) substantially formed in the central part thereof, said base being fixed to the bottom of said cabinet and located generally between two of said wheels provided on the bottom of said cabinet each side of said base having lateral holes extending therethrough for receiving
    an engaging rod having one end protruded outside said base capable of engaging said wheels in a fixed position and the other end having a guide pin thereon protruded over said groove (205);
    a slidable handle having an extension part mounted on said groove (205), said handle slidable in a direction perpendicular to a central axis of said engaging rods;
    a pair of guide plates mounted in said groove (205) and formed separately on the outer edges of said extension part, respectively, each of said guide plates having obliquely angled inner edges with respect to said central axis of said engaging rods, and each of said guide plates having ends being connected by a connecting bar, and said guide pins of said engaging rods capable of sliding along said inner edges of said guide plates,
    said guide plates when moved by pulling on said handle causing said guide pins to slide along said inner edges of said guide plates enabling the disengagement of said engaging rods from said wheels;
    said guide plates when moved by pushing said handle causing said guide pins to slide along said inner edges of said guide plates enabling the engagement of said engaging rods with said wheels.

2. The hand brake mechanism according to claim 1, wherein a retainer ring is provided on a retainer ring groove located at the approximate center of said engaging rod, and an opening is provided in said base at a location corresponding to said retainer ring groove for disposing a spring around said engaging rod, and one end of said spring touches said retainer ring and the other end of said spring touches the edge of said opening.

3. The handle brake mechanism according to claim 1, wherein said guide plate possesses an oblique inner edge extended outwardly from one end and possesses a chamfer abutting said oblique rim at the other end.

4. The handle brake mechanism according to claim 1, wherein each side of said extension part of said handle provides a sliding groove and a pair of guide lugs are provided on the edge of said groove of said base at a location corresponding to said sliding groove.

5. A hand brake mechanism for a cabinet, said cabinet having wheels mounted on a bottom surface for moving said cabinet, said wheels having spokes, comprising:
    a base having two sides and a groove substantially formed in a central part thereof, said base being fixed to the bottom of said cabinet and located generally between said wheels, said base having first and second lateral holes extending from said sides to said groove;
    a handle slidably mounted on said groove substantially between a first wheel and a second wheel;
    a first engaging rod disposed in said first lateral hole to engage said spokes of said first wheel;
    a second engaging rod disposed in said second lateral hole to engage said spokes of said second wheel;
    means for resiliently maintaining said first engaging rod between spokes of said first wheel;
    means for resiliently maintaining said second engaging rod between spokes of said second wheel;
    means, responsive to sliding said handle, for disengaging said first engaging rod from between said spokes of said first wheel by resiliently deforming said means for resiliently maintaining said first engaging rod between spokes of said first wheel, and for disengaging said second engaging rod from between said spokes of said second wheel by resiliently deforming said means for resiliently maintaining said second engaging rod between spokes of said second wheel.

6. The handbrake mechanism according to claim 5, wherein, said engaging rod further includes a guide pin protruding over said groove.

7. The handbrake mechanism according to claim 6, wherein said means for disengaging said engaging rod include a guide plate having an oblique inner edge extending outwardly from one end for moving said guide pin and said engaging rod laterally.

8. A hand brake mechanism for a cabinet having at least two wheels mounted on a bottom surface of the cabinet, the wheels having spokes, comprising:
    a base having two sides and a groove substantially formed in a central part of said base, said base fixed to the bottom of the cabinet and located generally between the wheels, said base having a lateral hole extending from each of said two sides to said groove;
    a handle slidably mounted on said groove;
    an engaging rod disposed in each of said lateral holes to engage the spokes of the wheels, each of said engaging rods having a guide pin protruding over said groove;
    means for resiliently maintaining said engaging rods between the spokes of the wheels;
    means, rigidly attached to said slidable handle, for disengaging said engaging rods from between the spokes of the wheels, said disengaging means including guide plates having an oblique angled inner edge for moving said guide pins of said engaging rods laterally with respect to the wheels.

* * * * *